UNITED STATES PATENT OFFICE.

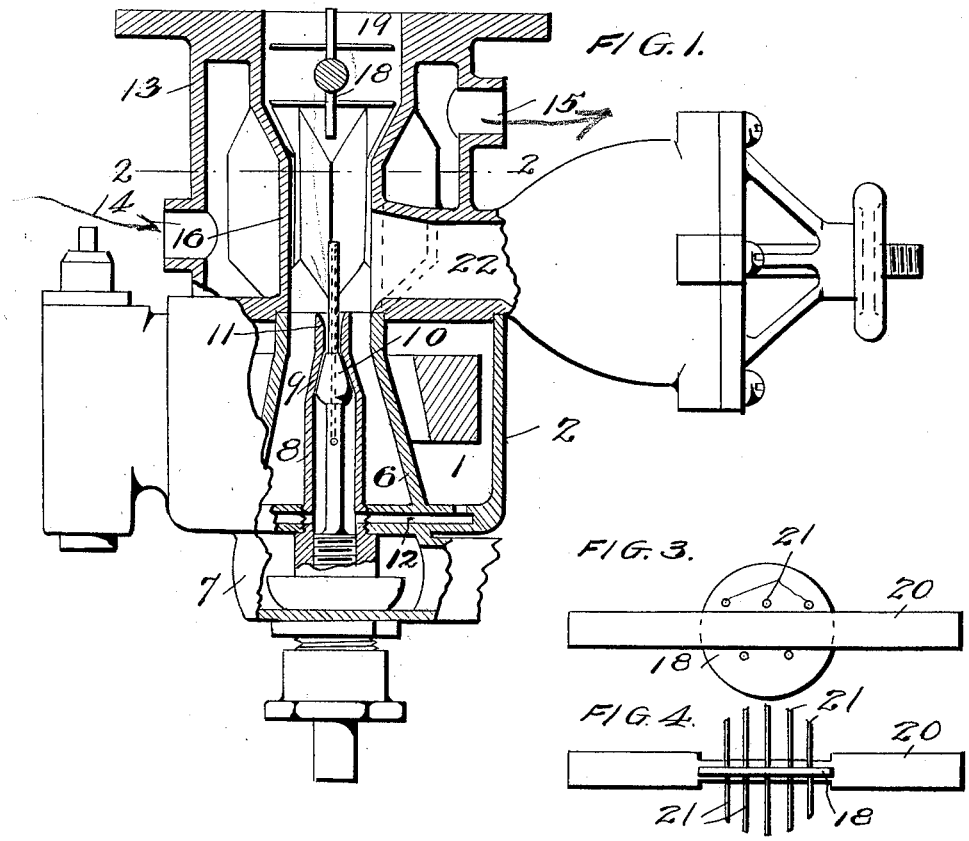

JOHN T. HAZELTON, OF SOMERVILLE, NEW JERSEY.

GASEOUS-FUEL MIXER.

1,079,338.  Specification of Letters Patent.  Patented Nov. 25, 1913.

Application filed September 21, 1912. Serial No. 721,625.

*To all whom it may concern:*

Be it known that I, JOHN T. HAZELTON, a citizen of the United States, residing at Somerville, in the county of Somerset and State of New Jersey, have invented certain new and useful Improvements in Gaseous-Fuel Mixers, of which the following is a specification.

My present invention relates to improvements in carbureters, and is designed particularly to provide means for heating the gases of combustion and commingling their ingredients as the fuel gas passes from the carbureter to the combustion chamber.

By the utilization of my invention I am enabled to thoroughly heat and atomize the gases of combustion and thus enhance the power of the charge and increase the efficiency of the engine, and at the same time attain these results in an economical manner.

In the accompanying drawings I have illustrated one complete example and a modified form of the physical embodiment of my invention, constructed according to the best modes I have so far devised for the practical application of the principles of the invention.

Figure 1 is an elevation of a carbureter, broken away in section, to illustrate the novel features of my invention. Fig. 2 is a transverse sectional view of Fig. 1 at line 2—2. Fig. 3 is a face view of the throttle. Fig. 4 is an edge view of the throttle.

In the preferred embodiment of my invention I have illustrated a type of carbureter wherein the fuel is contained in the float chamber 1 of the carbureter casing 2. Within the casing 2 is a central conical tubular wall 6, open at the top and communicating at its lower open end with an open chamber in the extension 7 for the admission of hot air as usual. Within the tube 6 is incased a nozzle 8 formed with the contracted portion 9 to accommodate the needle valve 10, around which the fuel may pass and out through the flaring mouth 11 of the nozzle. The fuel is admitted to the nozzle through the passages 12 from the fuel chamber 1.

The above described structure is more clearly set forth in my co-pending application Ser. No. 689,821, filed April 10, 1912, wherein claims are presented covering in combination, the air inlet, the fuel nozzle having a maximum passage and the needle valve having a minimum passage for spraying oil, as it comes from the reservoir or chamber, through the tube 8.

The essential novelty of the present invention resides in the superstructure located above the casing 2, which comprises a cylindrical casing 13, the outer walls of which are provided with inlet and outlet connections 14 and 15. The interior of the casing is formed with an inclosed wall 16, corrugated, as clearly shown in Fig. 2, and forms a continuation of the tube 6. These corrugations form channels 17 for the passage of gas therethrough, and the formation of the walls provides an increased heating area for the contained gases.

Above the heating chamber formed within the corrugated walls, the throttle 18 is located and is adapted to be turned within the chamber 19. The throttle is of usual construction, except that in addition to the disk or valve rotatable upon its trunnion 20, I utilize a number of pins or rods 21 which are passed through and secured in the disk 18 and project at each side thereof. It will be noted that the pins are arranged with a staggered relation to each other, and this arrangement provides for a breaking up of the gases and commingling of their ingredients as the fuel passes to the engine for combustion.

In operation, the fuel gas is drawn through the valves into the heating chamber within the corrugated walls, and at this point atmospheric air is taken in through the passageway 22. As the gases arise through the passages 17, they are heated by the hot air or hot water surrounding the corrugated walls and within the casing 13. The circulation of the heating element is from the inlet 14 around the corrugated walls and out through the outlet 15. The heated gases now pass through the space 19, where are located the pins of the throttle, and in passing therethrough the gases are completely broken up and thoroughly commingled, thus producing an enhanced degree of atomization.

Having thus fully described my invention, what I claim as new and desire to secure by Letters Patent is:—

1. The combination of a throttle inclosed within a casing forming part of a carbureter, with means on the throttle for disintegrating gases which pass through the casing.

2. The combination of a throttle inclosed within a casing forming part of a carbureter, with separated pins projecting from the throttle for disintegrating the gases that pass through the casing.

In testimony whereof I affix my signature in presence of two witnesses.

JOHN T. HAZELTON.

Witnesses:
CLIFFORD D. PHOENIX,
AARON T. KLINE.

Copies of this patent may be obtained for five cents each, by addressing the "Commissioner of Patents, Washington, D. C."